2,709,161

MANUFACTURE OF SILICONE RUBBER

Frederick L. Kilbourne, Jr., Woodmont, and William B. Davis, Short Beach, Conn., assignors to The Connecticut Hard Rubber Company, New Haven, Conn., a corporation of Connecticut No Drawing. Application April 25, 1952, Serial No. 284,446

7 Claims. (Cl. 260—37)

This invention relates to the manufacture of silicone rubber, and more particularly to a new method of compounding and curing a silicone rubber mixture, and it also relates to the improved product produced by the practice of the new method.

An object of the invention is to improve the physical characteristics, including tensile strength, elongation and hardness, of silicone rubber.

Another object is to accomplish the cure of silicone rubber mixtures with less shrinkage than has occurred heretofore.

Another object is to provide a method which is more advantageous than previous methods on account of the reduction in the amount of the curing agent needed to accomplish a given degree of cure.

In the manufacture of silicone rubber as at present conducted, the silicone rubber gum and the pigment, together with the curing agent, are all mixed together on a two-roll mill or in an internal mixer so as to provide a homogeneous mixture of the gum, pigment and curing agent. After milling for the purpose of thoroughly mixing the three components, the next step is to remove the mix from the mill, introduce it into a mold, and give it a preliminary heat treatment in the mold, usually for from 5 to 30 minutes at from 225° F. to 275° F. The next step is to remove the material from the mold and give it a longer heating at a higher temperature in an oven, for example, a heating from one to 48 hours at a temperature of from 300° F. to 480° F.

The proportions of the mix are changed to meet different conditions arising, for example, from the nature of the silicone polymer, the nature of the pigment, the nature of the curing agent, and the characteristics which are desired in the finished product.

The silicone elastomer may be, for example, a polymerized dimethyl silicone such as No. 81,176 of the General Electric Company. This elastomer as used is in the form of a gum having the consistency of a stiff jelly. The pigment is customarily a finely divided mineral or precipitate such as the oxide of silicon, or an oxide of aluminum or titanium. A suitable aluminum oxide pigment is sold by Godfrey L. Cabot Co. under the name "Alon." Another suitable pigment is known as "Hi-Sil," which is a finely divided silica pigment of average particle size of .025 microns, sold by Columbia Chemical Division of the Pittsburgh Plate Glass Co. Another suitable pigment is "Santocel C," which is a fairly coarse but very porous silica aerogel, sold by Monsanto Chemical Company. Another suitable pigment is known as "Titanox RANC," which is a rutile type of titanium dioxide sold by the Titanium Pigment Co., and noted for its high covering power as a white pigment.

Other pigments which have been used to demonstrate that our process is generally applicable to improve the properties of silicone vulcanizates include various forms of carbon black, whiting, diatomaceous earth, zinc oxide, and others.

According to the present invention, the curing agent, for example, benzoyl peroxide, instead of being introduced into the mix in the preliminary part of the mixing procedure, is not added until the gum and the pigment have been mixed together and given a preliminary treatment by heating the mix. In our procedure, the preferred practice, which includes preliminary treatment of the gum and pigment mix before the addition of the curing agent, includes the step of removing the partially mixed gum and pigment from the mill, heating the mix for the purpose of securing certain results as hereinafter mentioned, returning it to the mill, and then adding the curing agent, after which the further steps of two stages of heating can be carried out in the usual or any preferred manner.

As an example, the practice may be as follows:

EXAMPLE 1

One hundred volumes of polymerized dimethyl silicone (G. E. No. 81,176) and 20 volumes of aluminum oxide pigment ("Alon") are placed on an open mill and mixed together until a substantially homogeneous mixture of these two ingredients is formed. The next step is to remove the mix from the mill and heat it for one hour at 300° F. The heating can be carried out in a suitable oven, for example. After cooling, the mix is returned to the mill and mixing continued, and 3% by weight of benzoyl peroxide based on the polymer are added. Mixing is continued until the curing agent has been thoroughly worked into the mixture. The mixture is then removed from the mill and then subjected to the two-stage curing treatment, as above indicated, to effect full cure or vulcanization.

EXAMPLE 2

The procedure is the same as in Example 1, with the exception that 15 volumes of finely divided silica pigment ("Hi-Sil") are used, and 2% by weight of benzoyl peroxide.

By proceeding in the manner described above, namely, preparing a mix of the silicone rubber and the pigment, and heating this mix before the addition and incorporation of the curing agent, the physical properties of the resulting composition, including tensile strength, elongation and hardness, are improved to a notable degree. This is shown by tables hereinafter given. This effect is believed to be due in large measure to the enhanced reinforcing effect of the pigment component, brought about by more intimate mixing of the pigment and rubber before there is any action of the curing agent. When the mix is given a heat treatment before the curing agent is added, the effect of the heat is to thin the mix to some degree so as to increase the homogeneity and close contact of the pigment particles with the rubber before the curing agent is added. Furthermore, the preliminary heating of the mix before the addition of the curing agent is believed to improve the product by removing moisture on the pigment particles which inhibits the creation of good bonds between the particles of the pigment and the particles of rubber. The removal also of lower molecular weight constituents of the silicone rubber itself at this stage is believed to have a beneficial effect in preshrinking the mix and thereby reducing the amount of shrinkage when the mix is heated at a later stage in the mold. Another advantage of this method of procedure is the reduction in the amount of curing agent required, in which respect there is a definite saving.

In the following table are shown some of the results we have obtained by the use of our improved compounding method, as compared with the usual results in compounding silicone rubber. In this table are compared the physical properties of typical batches of silicone rubbers prepared from the same silicone rubber gum (G. E. No. 81,176) with the same aluminum oxide pigment ("Alon") in varying proportions, prepared and cured by the customary method (indicated by the letter A), and by our improved method (indicated by the letter B). The actual periods of curing in this test were 15 minutes at 250° F. in the mold, and one hour in the oven at 300° F.:

TABLE I

| Volume Loading of "Alon" per 100 of Rubber | | Benzoyl Peroxide, Percent | Stress @ 200% | Tensile Strength | Elongation, Percent | Hardness, Shore A |
|---|---|---|---|---|---|---|
| 10 | A | 3.0 | 162 | 702 | 733 | 33 |
|    | B | 1.8 | 170 | 814 | 733 | 30 |
| 15 | A | 3.5 | 155 | 558 | 850 | 39 |
|    | B | 2.0 | 160 | 708 | 733 | 37 |
| 20 | A | 4.0 | 381 | 621 | 413 | 60 |
|    | B | 3.0 | 345 | 629 | 442 | 57 |

It is apparent from this table that equivalent cures are obtained with substantially less curing agent when our procedure is followed. Actually the savings of benzoyl peroxide are respectively 40%, 43% and 25% in the three cases noted. The results given in Table I represent the best results obtained in each case from a great many different experiments and combine the best results by the customary method with the best obtained by our new method.

The figures given in the following table compare the results obtained in using pigments other than "Alon," in the customary method and in the new method. All mixes were made with 2% benzoyl peroxide, and curing times were the same as in Table I. For purposes of brevity, the pigments, which are among others referred to previously, are identified by their trade designations:

TABLE II

| Pigment Loading | Stress @ 200% | Tensile Strength | Elongation, Percent | Hardness, Shore A |
|---|---|---|---|---|
| "Hi-Sil," 15 Vol.: | | | | |
| A | 217 | 216 | 283 | 37 |
| B | 354 | 456 | 258 | 40 |
| "Santocel C," 15 Vol.: | | | | |
| A | 387 | 737 | 383 | 52 |
| B | 676 | 826 | 275 | 56 |
| "Titanox RANC," 40 Vol.: | | | | |
| A | 197 | 484 | 417 | 41 |
| B | 507 | 581 | 267 | 45 |

It has also been found that the enhanced properties obtained by our improved method persist as the length of oven curing time is increased. This is shown by the following table:

TABLE III

*Effect of preheating treatment with both short and long cures*

Basic recipe:
  G. E. 81,176 _____ 100 volumes.
  "Alon" _____ 15 volumes.
  Benzoyl Peroxide _____ 3 percent by weight on the polymer.

[Preheat on mix C and D 1 hour @ 300° F. before adding benzoyl peroxide. All slabs were mold-cured 15 minutes @ 230° F. and oven cured 1 hour @ 300° F.]

| Compound | Preheat | Extra Cure | Stress @ 400% El., p.s.i. | Tensile, p.s.i. | Elongation, Percent | Hardness, Shore A | Volume Shrinkage after Mold Cure |
|---|---|---|---|---|---|---|---|
| A | No | None | 112 | 121 | 437 | 27 | 9.6 |
| B | No | 24 hrs. @ 400° F | 316 | 368 | 425 | 39 | 12.2 |
| C | Yes | None | 400 | 692 | 675 | 31 | 6.1 |
| D | Yes | 24 hrs. @ 400° F | 840 | 975 | 450 | 42 | 6.1 |

It will be seen from this table that the best results that were obtained without preheating are those obtained with compound B, and that compounds C and D show great superiority obtained by the use of the improved method. The shrinkage after the curing treatment in the mold is definitely reduced in comparison to the usual method, and apparently this is independent of the additional curing time given compound D.

The preheating of the mix as above described is believed to have effect not only with respect to the elimination of moisture from the pigment but also by evaporating out some of the lower boiling constitutents of the gum which might otherwise act as diluents or plasticizers. Whatever may be the explanation, the procedure as herein described has been demonstrated to have the successful effects mentioned above as regards the process of compounding, and beneficial results also in the curable or cured composition produced by the process. It is, of course, understood that additives or minor ingredients usually or desirably used in the compounded rubber may be employed in our procedure if so used as not to interfere with or detract substantially from the desirable results of the new process.

The disclosure herein is understood to be by way of example only, and various changes in the details of the procedure may be made without departing from the principles of the invention or the scope of the claims.

What we claim is:

1. A method which comprises devolatilizing a mixture of a rubbery dimethyl polysiloxane and an inorganic filler by heating the same in the absence of a curing catalyst to evaporate low boiling constituents and thereafter compounding the mixture with a peroxide catalyst and curing.

2. A method which comprises devolatilizing a mixture of a rubbery dimethyl polysiloxane and an oxide pigment by heating the same in the absence of a curing catalyst to evaporate low boiling constituents and thereafter compounding the mixture with a peroxide catalyst and curing.

3. A method set forth in claim 2 wherein the oxide pigment is an aluminum oxide.

4. A method set forth in claim 2 wherein the oxide pigment is silica.

5. The method set forth in claim 2 wherein the mixture of dimethyl polysiloxane and oxide pigment is heated substantially one hour at a 300° F. temperature prior to the addition of the curing agent.

6. A method which comprises devolatilizing a mixture of a rubbery dimethyl polysiloxane and an inorganic filler by heating the same in the absence of a curing catalyst to evaporate low boiling constituents, compounding the mixture with a peroxide catalyst, heating the resulting mixture in a mold for a period of from 5 to 30 minutes at a temperature of from 225° to 275° F., removing the mixture from the mold and heating the same further from 1 to 48 hours at a temperature of from 300° to 480° F.

7. The method set forth in claim 6 wherein the mixture of dimethyl polysiloxane and inorganic filler is heated in the absence of a curing catalyst substantially one hour at a temperature of 300° F.

References Cited in the file of this patent

UNITED STATES PATENTS

| | | |
|---|---|---|
| 2,405,041 | Mathes | July 30, 1946 |
| 2,428,608 | Bass | Oct. 7, 1947 |
| 2,460,795 | Warrick | Feb. 1, 1949 |
| 2,467,853 | Poskitt et al. | Apr. 19, 1949 |
| 2,671,069 | Savage | Mar. 2, 1954 |

OTHER REFERENCES

Rochow: "Introduction to The Chemistry of the Silicones," 2nd ed., Wiley, page 95.